Sept. 1, 1936. C. J. DOCKRAY ET AL 2,052,921
CHILLED METAL MOLD CASTING
Filed Jan. 2, 1935 2 Sheets-Sheet 2

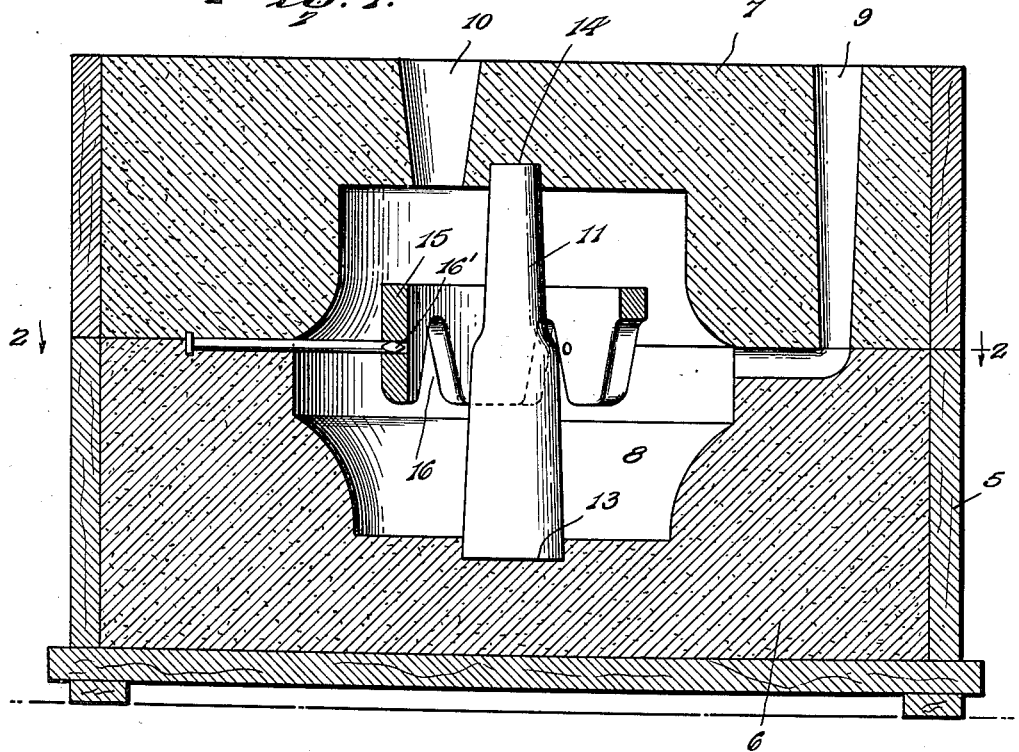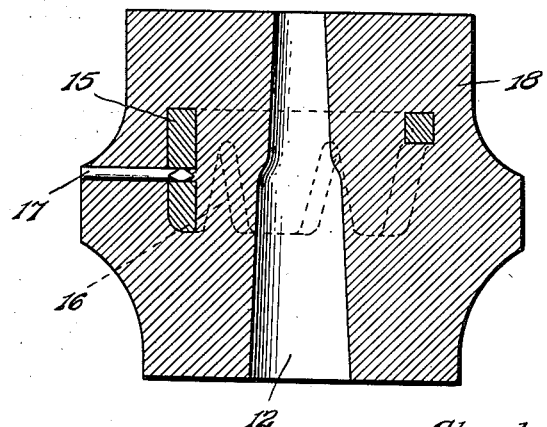

Inventors
Charles J. Dockray.
Harry J. Dockray.
By Lacey & Lacey, Attorneys

Patented Sept. 1, 1936

2,052,921

UNITED STATES PATENT OFFICE 2,052,921

CHILLED METAL MOLD CASTING

Charles J. Dockray and Harry J. Dockray,
Zanesville, Ohio

Application January 2, 1935, Serial No. 146

3 Claims. (Cl. 22—116)

This invention relates to chilled metal castings used in the construction of glass molds and the like, and more particularly to means for controlling the chilled surfaces thereof.

Heretofore, in the art to which this invention pertains, considerable difficulty has been experienced in obtaining a uniform density or fineness of the grain of the metal around the walls of the sand mold cavity during the pouring operation, this being due to the fact that when the metal is poured into the sand mold, the molten metal at the bottom of the mold tends to heat the chill, with the result that the metal around the upper portion of the sand mold cavity is often of an open grain or porous nature instead of presenting a dense close texture.

Such flaws or defects in the metal are seldom detected until the glass mold is reamed or finished preparatory for use, and as it is essential that the walls of the glass mold cavity be free from surface pores or pits to produce the best results, it follows that such defective castings must be discarded which not only entails a loss of time but also the expense incident to casting and finishing a replacement mold.

Furthermore, when the walls of the glass mold are relatively thin, the heat from molten glass soon causes the mold to become excessively hot which necessitates either cooling the mold at frequent intervals or replacing the heated mold with a new one.

The object of the present invention is to overcome these objectionable features by providing a casting, the construction of which is such that the walls of the glass mold cavity will present a uniformly dense fine grain throughout the entire effective area thereof, and to make the walls of the casting of sufficient thickness or mass volume to take up and uniformly distribute the heat throughout the mass of metal during the molding of glass articles so as to increase the effective life of the mold. This is accomplished by means of an auxiliary chill which is molded or anchored in the metal in the sand mold cavity during the casting operation and which prevents overheating of the main chill, thereby permitting proper chilling of the metal at the upper, as well as the lower portion of the sand mold so that the chilled metal surfaces of the glass mold will be of uniform density and free from superficial pits or pores.

A further object of the invention is to provide novel means for supporting or suspending the auxiliary chill within the flask during the pouring operation and means for permitting the passage of heat through the auxiliary chill when the glass mold is used for forming tumblers, bottles and other glassware.

In the accompanying drawings forming a part of this specification in which similar numerals of reference indicate corresponding parts in all the figures of the drawings, Figure 1 is a vertical sectional view of a molding apparatus constructed in accordance with the present invention.

Figure 4 is a vertical sectional view of the completed mold or casting.

Figure 2:
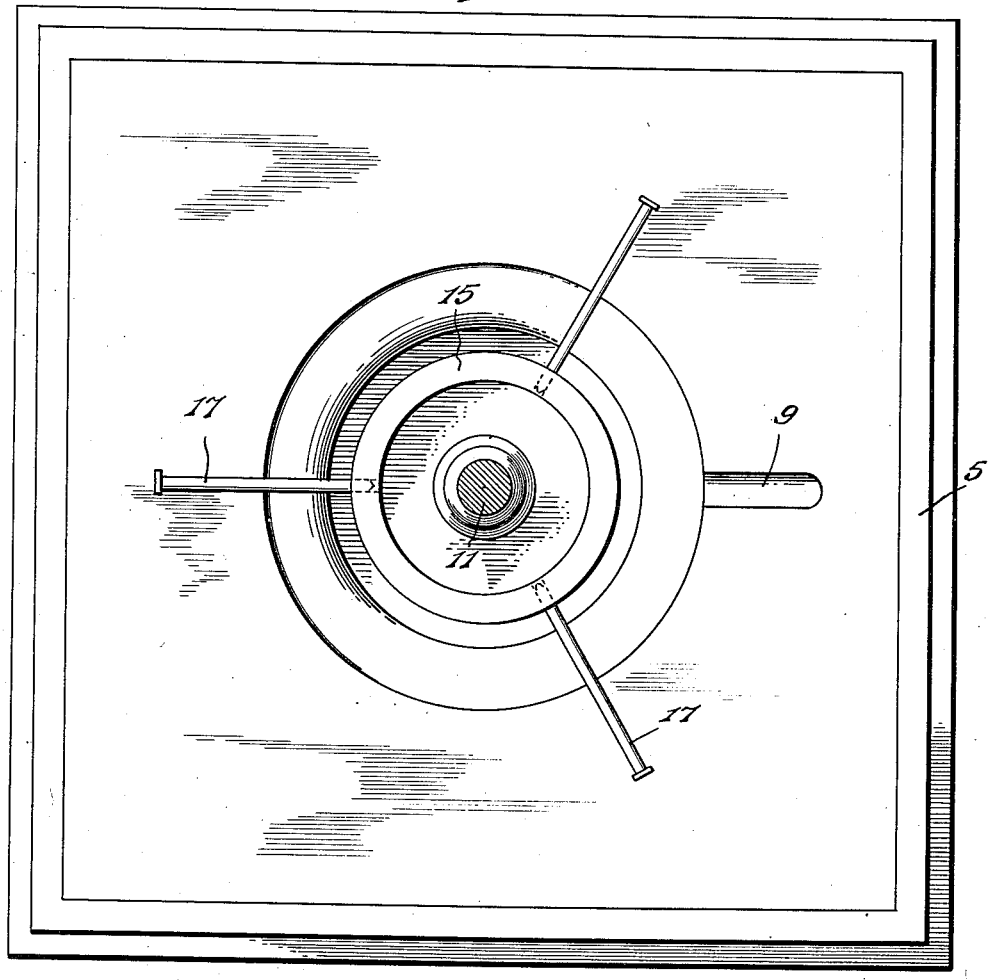
Figure 2 is a top plan view looking at the apparatus on the line 2—2 of Figure 1.
Figure 3:
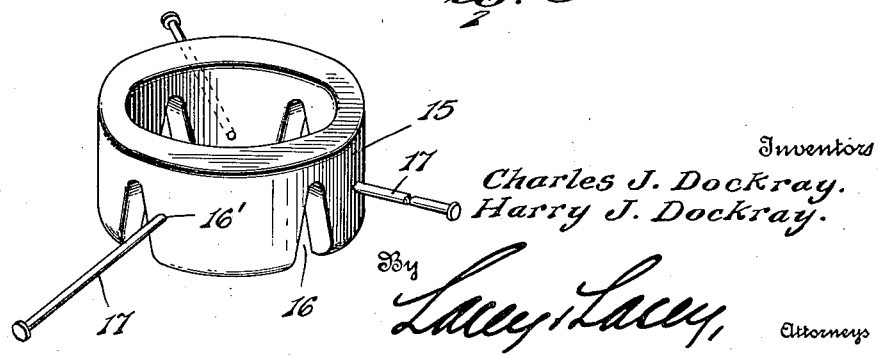
Figure 3 is a perspective view of the auxiliary chill detached.

In carrying the present invention into effect, I provide a molding flask 5 including a drag 6 and a cope 7, the parts being freely separable and adapted to be fastened together in any suitable manner during the casting operation. After the flask has been set up, a pattern, not shown, of the size and configuration of the mold or casting to be produced is placed within the sand and subsequently withdrawn to produce a shaping cavity 8 adapted to receive molten metal through a gate 9, the cope 7 being provided with the usual header 10 to allow for shrinkage of the metal during the casting operation. Disposed within the cavity 8 is a main or central chill 11 of a shape and size conforming to the shape and size of the cavity 12 to be formed in the casting, and the upper and lower ends of this central chill are preferably seated in centering sockets 13 and 14 so as to prevent displacement of the chill when pouring the molten metal. Surrounding the main chill, preferably near the upper portion thereof, and spaced laterally therefrom is an auxiliary chill 15, preferably annular in shape, and having its lower edge cut away to form recesses 16, preferably substantially V-shaped, and this auxiliary chill 15 serves to prevent overheating of the main chill by absorbing a portion of the heat from the molten metal so as to maintain the central chill 11 at a uniform cool temperature throughout its entire height and thus produce a fine close grain at the walls of the glass mold cavity 12. The auxiliary chill 15 may be suspended within the shaping cavity 8 in any suitable manner but it is preferred to provide said auxiliary chill with spaced transverse openings 16' adapted to receive chaplets or anchoring pins 17 which latter may, if desired, rest on the sand at the junction of the drag and cope of the flask, as best shown in Figure 1 of the drawings.

In operation, the main or central chill 11 and the outer or auxiliary chill 15 are positioned within the shaping cavity 8, as best shown in Figure 1 of the drawings, after which the molten metal is introduced through the gate 9 in the usual manner. As the molten metal fills the bottom of the cavity 8, a portion of the heat from the molten metal will be absorbed by the auxiliary chill 15 so that the walls of the glass mold at the cavity 12 will be uniformly chilled throughout their entire effective area and thus cause the metal at said walls to present a fine close or dense grain necessary to obtain the best results in molding glass articles.

It will thus be seen that this auxiliary chill 15 prevents overheating of the main chill and consequently prevents the metal around the walls of the glass mold chamber 12 from becoming porous or pitted, which generally occurs where but a single chill is employed. In other words, the auxiliary chill 15 prevents premature heating of the upper portion of the main chill and thus insures an even close grain texture of the metal throughout the entire height of the glass mold chamber. After the pouring operation, the flask is disassembled and the completed casting, indicated at 18, removed therefrom leaving the auxiliary chill 15 embedded in the casting and forming a permanent part thereof.

The pins 17 are then cut or otherwise severed flush with the outer surface of the casting 18 and the latter shipped to the glass factory where the cavity 12 is reamed out or finished.

It is imposible to determine whether the metal at the walls of the glass mold cavity is porous or otherwise defective until the mold cavity is reamed or otherwise finished as said pores are exposed only during the finishing operation and should the metal at the molding surface of any of the castings be more or less porous, said castings cannot be used and are a total loss, and the present invention obviates this loss and the expense incident thereto.

Attention is here called to the fact that the walls of the glass mold or casting 18 are relatively thick and massive, while the auxiliary chill 15 is embedded therein and forms a permanent part of said glass mold or casting so that when molten glass is introduced within the mold cavity 12, the heat from the glass will pass through the opening 16 in the chill 15 and be uniformly distributed throughout the entire mass of metal and thus permit the use of the mold for an indefinite period without shutting down operations to effect cooling thereof or replacement of the molds due to excessive heat conditions.

It will thus be seen that the auxiliary chill 15 not only serves to prevent porosity of the metal but also serves to reinforce the finished glass mold or casting and insures an even distribution of heat throughout the mass of metal constituting the mold during the molding of tumblers, bottles or other glassware.

It will, of course, be understood that the auxiliary chills may be made in different shapes and sizes according to the specific purpose for which the mold or casting is to be employed and that said auxiliary chills may be suspended within the flask in any suitable manner which will insure proper centering of the auxiliary chill with respect to the main chill, the essential feature of the invention residing in the employment of an auxiliary chill to prevent overheating of the main chill and thus insure a dense and satisfactory close grain in the casting and which auxiliary chill forms a permanent part of the finished glass mold or casting.

Having thus described the invention, what is claimed as new is:

1. A molding apparatus including a shaping cavity, an elongated main chill positioned within the cavity axially thereof for the full depth of the chamber, an auxiliary chill in said cavity surrounding the main chill concentric thereto in spaced relation to the main chill and walls of the cavity and of less length than the main chill, the auxiliary chill being formed with recesses leading from its lower edge in spaced relation to each other and providing spaces for passage of metal when the cavity is filled with moulten metal, and supporting pins carried by the auxiliary chill between the recesses and projecting outwardly therefrom with their outer portions embedded in walls of the chamber and firmly supporting the auxiliary chill in the chamber in spaced relation to the main chill and walls of the chamber and also in spaced relation to ends of the main chill and ends of the chamber.

2. A molding apparatus including a shaping cavity having a pouring gate communicating therewith, a main chill positioned within the cavity, an auxiliary chill surrounding the intermediate portion of the main chill and spaced laterally therefrom, the auxiliary chill being formed with recesses and with perforations between the recesses, and supporting pins mounted in the perforations and carried solely by the auxiliary chill independent of the main chill and extending outwardly from the auxiliary chill and embedded in walls of the chamber for centering the auxiliary chill with respect to the main chill and supporting the auxiliary chill in spaced relation to the main chill and to walls of the cavity.

3. A molding apparatus including a shaping cavity having a peripheral wall and top and bottom walls, an elongated main chill positioned in the cavity axially thereof for the full depth of the cavity in spaced relation to the peripheral walls thereof with its upper and lower ends contacting top and bottom walls of the cavity, an auxiliary chill in said cavity surrounding the intermediate portion of the main chill in spaced relation to the main chill and the peripheral walls of the cavity and of appreciably less length than the main chill and spaced from the top and bottom walls of the cavity, and supporting members carried by the auxiliary chill in spaced relation to each other circumferentially thereof and radiating outwardly from the auxiliary chill with their outer portions embedded in the peripheral walls of the cavity and supporting the auxiliary chill about the main chill in spaced relation thereto and in spaced relation to the peripheral walls and top and bottom walls of the cavity.

CHARLES J. DOCKRAY.
HARRY J. DOCKRAY.